United States Patent [19]

Schmidt

[11] 4,259,129
[45] Mar. 31, 1981

[54] METHOD AND APPARATUS FOR MOLDING A TIRE WITH AN ANNULAR REINFORCEMENT BELOW THE TREAD SURFACE

[76] Inventor: Oskar Schmidt, Chicago 5, 2421 Kittsee/Bgld., Austria

[21] Appl. No.: 951,659

[22] Filed: Oct. 16, 1978

[30] Foreign Application Priority Data

May 3, 1978 [AT] Austria ................................. 3234/78

[51] Int. Cl.³ .......................................... B29H 17/04
[52] U.S. Cl. ................................... 156/125; 156/117; 264/257; 264/326
[58] Field of Search ........... 152/357 R, 357 A, 361 R; 156/110 R, 110 CL, 117, 123 R, 125, 128 R, 128 N, 394, 397, 405, 414; 264/257, 326; 425/46, 49

[56] References Cited

U.S. PATENT DOCUMENTS

| | | | |
|---|---|---|---|
| 1,805,026 | 5/1931 | State | 156/128 R |
| 2,724,425 | 11/1955 | Ostling | 156/125 |
| 2,915,102 | 12/1959 | Alexeff et al. | 156/117 X |
| 3,020,190 | 2/1962 | Pfeiffer | 156/125 |
| 3,192,984 | 7/1965 | Bourdon | 156/123 |
| 3,607,497 | 9/1971 | Chrobak | 156/117 |
| 3,775,528 | 11/1973 | Beneze | 152/357 A |
| 3,837,986 | 9/1974 | Gorter et al. | 152/357 A |
| 3,947,540 | 3/1976 | Hashimoto | 264/326 |
| 4,075,275 | 2/1978 | Nishimura et al. | 264/326 |

FOREIGN PATENT DOCUMENTS 339757 11/1977 Austria.
2655863 6/1977 Fed. Rep. of Germany ...... 152/357 A Primary Examiner—John E. Kittle
Attorney, Agent, or Firm—Michael J. Striker

[57] ABSTRACT

A method for molding a tire with an annular reinforcement below the tread surface in which first a tire body is molded and then a flexible reinforcement formed by bands or threads is wound, preferably under tension, in form of a helix about the circumference of the tire body, whereafter a tread surface portion is molded about the tire body and the reinforcement thereon; and an apparatus for carrying out the method.

7 Claims, 6 Drawing Figures

METHOD AND APPARATUS FOR MOLDING A TIRE WITH AN ANNULAR REINFORCEMENT BELOW THE TREAD SURFACE

BACKGROUND OF THE INVENTION

The present invention relates to a method for molding a tire in which two regions of the tire are molded in successive steps with an annular reinforcement provided between the two tire regions. The present invention relates also to an apparatus for carrying out such a method.

The forces resulting from the air pressure in a tire for motor vehicles are usually taken up by diagonally or radially arranged textile or wire reinforcements. Due to these reinforcements, the production of such tires has been carried out by manual labor which entailed high cost, considerable time and also some inaccuracies during mounting and fixing of the reinforcement, resulting in low quality tires which had to be often discarded.

It has therefore been tried to produce tires for motor vehicles from plastic elastomers without any reinforcement, whereby the total forces, resulting from the air pressure within the tire and from the centrifugal force during operation of the tire, are taken up only by the elastomer. This permits an automatic production of the tire by injection molding.

The production of tires without an annular reinforcement is however connected with difficulties if such tires are formed with a height and width relationship in which this relationship differs from a 1:1 relationship, since a toroidal-shaped hollow body of relatively small and constant wall thickness tends to assume a circular cross-section when subjected to an inner air pressure.

SUMMARY OF THE INVENTION

It is an object of the present invention to provide a method as well as an apparatus for molding tires for motor vehicles with an annular reinforcement below the tread surface of the tire and which permits to produce such a tire in a very efficient and exact manner.

With these and other objects in view, which will become apparent as the description proceeds, the method according to the present invention for producing a tire with a reinforcement below the tread surface of the tire mainly comprises the steps of molding a tire body about a core, subsequently winding a reinforcement about the circumference of the tire body, and finally molding a further portion of the tire about the reinforcement to form the tread surface of the tire.

The present invention relates also to an apparatus for carrying out the above method and this apparatus mainly comprises support means, a core mounted on the support means for rotation about its axis and adapted to carry a tire body for rotation therewith, and means for guiding an elongated flexible reinforcement onto the outer surface of the tire body on the core during rotation of the latter. Preferably the apparatus includes further two groups of outer mold segments mounted on the support means about the core for respectively molding a tire body and the tread surface of the tire about the tire body and the reinforcement wound about the circumference of the tire body. The two groups of segments are preferably tiltable about tilting axes extending laterally of and transversely to the axis of the core and respectively spaced from opposite ends of the latter. The support means may comprise an upright column having an upper and a lower part movable in axial direction with respect to each other in which one of the parts carries one of the groups of segments tiltable about the abovementioned tilting axes and the other of the parts carrying the other groups of segments tiltable about their pivot axes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
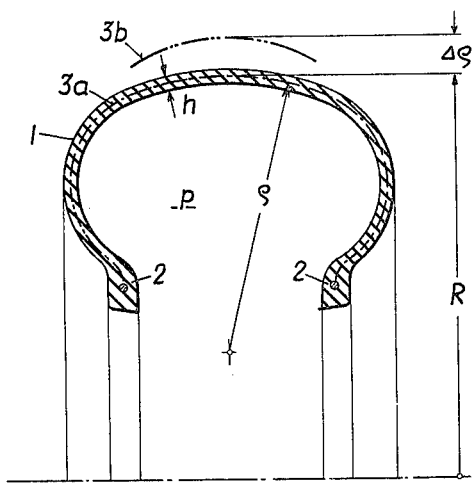
FIG. 1 is a schematic cross-section through a tire.

FIG. 1 schematically illustrates a cross-section through a tire and the deformation of the same under the influence of the air pressure in the interior thereof.

The tire shown in partial cross-section in FIG. 1 has a tire body 1 and two bead rings 2. The dash-dotted line designated with the reference numeral $3a$ illustrates the wall thickness center line of the non-deformed tire and the dash-dotted line $3b$ illustrates the center line when the tire is subjected to an inner air pressure. The tread profile of the tire is omitted in FIG. 1 since it contributes very little to the support of the tire.

If the bending stiffness of the tire is disregarded, then the deformation of the tire after introducing into the latter air with a pressure p can be determined by the equation $$\Delta \zeta = \frac{p}{E \cdot h (\frac{1}{\zeta^2} + \frac{1}{R^2})}$$

wherein E is the modulus of the tire body at 100% elongation.

In tires in which the height to width relationship differs from a relationship of 1:1 the radius $\rho$ of curvature of the tire will become very large and reaches at very flat and wide tires practically an infinite value so that $$E \times h (\frac{1}{\zeta^2} + \frac{1}{R^2})$$

will become very small so that at a certain value of p the deformation Δp of the tire becomes unacceptably high.

The tire is further deformed during operation thereof by the centrifugal force which may reach the same value as the inner tire pressure. Such large tire deformation will result in very high tensions in the tire body which mainly occur in the center region of the same.

In order to avoid such large deformation and high tensions, the present invention provides an annular reinforcement between the tire body and the tread surface thereof.

Figure 2:
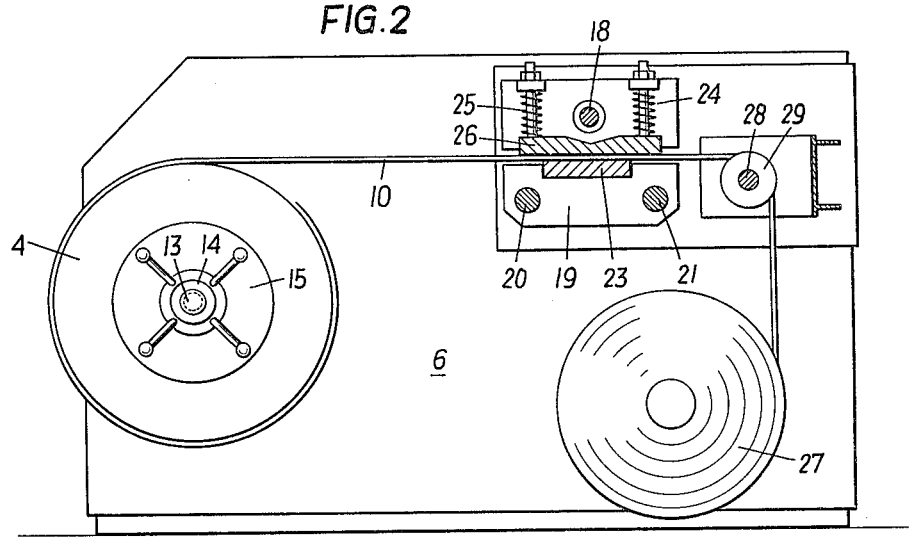
FIG. 2 is a partially sectioned side view of an apparatus for winding a reinforcement about the circumference of a tire body.
Figure 3:
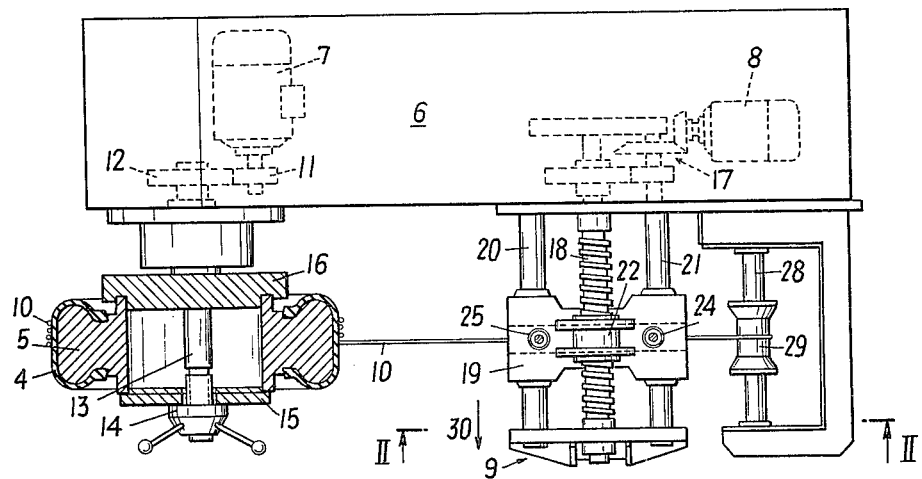
FIG. 3 is a partially sectioned top view of an apparatus similar to that shown in FIG. 2.

FIGS. 2 and 3 illustrate an apparatus according to the present invention in which an annular reinforcement is wound about a tire body outside of an apparatus for molding the same. Thereby the tire body 4, that is the inner region of the tire, is molded in a known apparatus for instance in an apparatus as disclosed in the Austrian Pat. No. 339,757 onto a core 5. The core 5 including the tire body 4 molded thereon is taken out of the aforementioned molding apparatus and mounted in the winding apparatus illustrated in FIGS. 2 and 3.

The winding apparatus illustrated in FIGS. 2 and 3 comprises a gear box 6 which contains a drive motor 7 for rotation of the core 5 and a drive motor 8 for the guide arrangement 9 of the reinforcement 10. The drive motor 7 drives over spur gears 11 and 12 a shaft 13 provided at its outer ends thereof with a thread onto which a clamping nut 14 is threadingly connected. By means of the clamping nut 14 the core 5 may be clamped on the shaft between two clamping flanges 15 and 16 engaging inner portions of the core at opposite ends thereof so that the core 5 is connected to the shaft 13 for rotation therewith.

Drive motor 8 drives by means of a gearing 17 comprising two conical gears and two spur gears, as shown in FIG. 3, a threaded spindle 18. The motor 8 is reversible, in a manner known per se, so that the spindle 18 may be turned in opposite directions. The apparatus includes further a guide 19 for the reinforcement 10 and the guide 19 is guided in direction transverse to the elongation of the reinforcement 10 on two rods 20 and 21 projecting from one side of the gear box 6. The guide 19 is further provided with a nut 22 rotationally but axially immovably mounted thereon which is in engagement with the thread of the spindle 18. The guide 19 has a lower guide plate 23 (FIG. 2) and an upper guide plate 26 pressed against the lower guide plate and a portion of the reinforcement sandwiched therebetween by compression springs 24 and 25. The reinforcement 10, illustrated in FIGS. 2 and 3 as an elongated thread, is wound onto a reel 27 and guided from there over a roller 29, freely turnably mounted on a guide 28, between the guide plates 23 and 26 of the guide 19.

After the core 5 with the tire body 4 thereon is clamped on the shaft 13 in the aforedescribed manner, the reinforcement 10 taken from the reel 27 is drawn over the guide roll 29 and between the plates 23 and 26 of the guide 19 and its free end is connected in any known manner to the peripheral surface of the tire body 4 to one side of a center plane thereof, whereafter the shaft 13 is rotated by actuating the drive motor 7. At the same time the drive motor 8 is also actuated to thereby rotate the spindle 18 whereby the guide 19 with the reinforcement located between the plates 23 and 26 thereof is shifted in direction of the arrow 30. Thereby the reinforcement 10 is wound in form of a helix about the peripheral surface of the tire body 4.

If only one layer of the reinforcement has to be wound onto the tire body 4, the drive motors 7 and 8 are stopped after the guide 19 is shifted in the direction of the arrow 30 through a predetermined distance, the reinforcement 10 is severed between the tire body 4 and the guide 19 and its free end is then fixed in any manner known in the art to the tire body. It is, however, also possible to wind the reinforcement 10 in a plurality of layers onto the tire body 4 in which case the guide 19 is moved back and forth by reversing the drive 8, 17.

The reinforcement 10 need not be formed by an elongated thread, but it is also for instance possible to wind the reinforcement formed by narrow bands onto the tire body 4 with the above-described arrangement. If the drive motor 8 is not actuated during rotation of the core and the guide 19 is held in a middle position as illustrated in FIG. 3 it is also possible to wind a wide band centrally and without pitch onto the tire body 4.

The upper spring pressed plate 26 of the guide 19 acts like a brake onto the reinforcement 10 so that the reinforcement is wound under tension onto the tire body 4.

Figure 4:
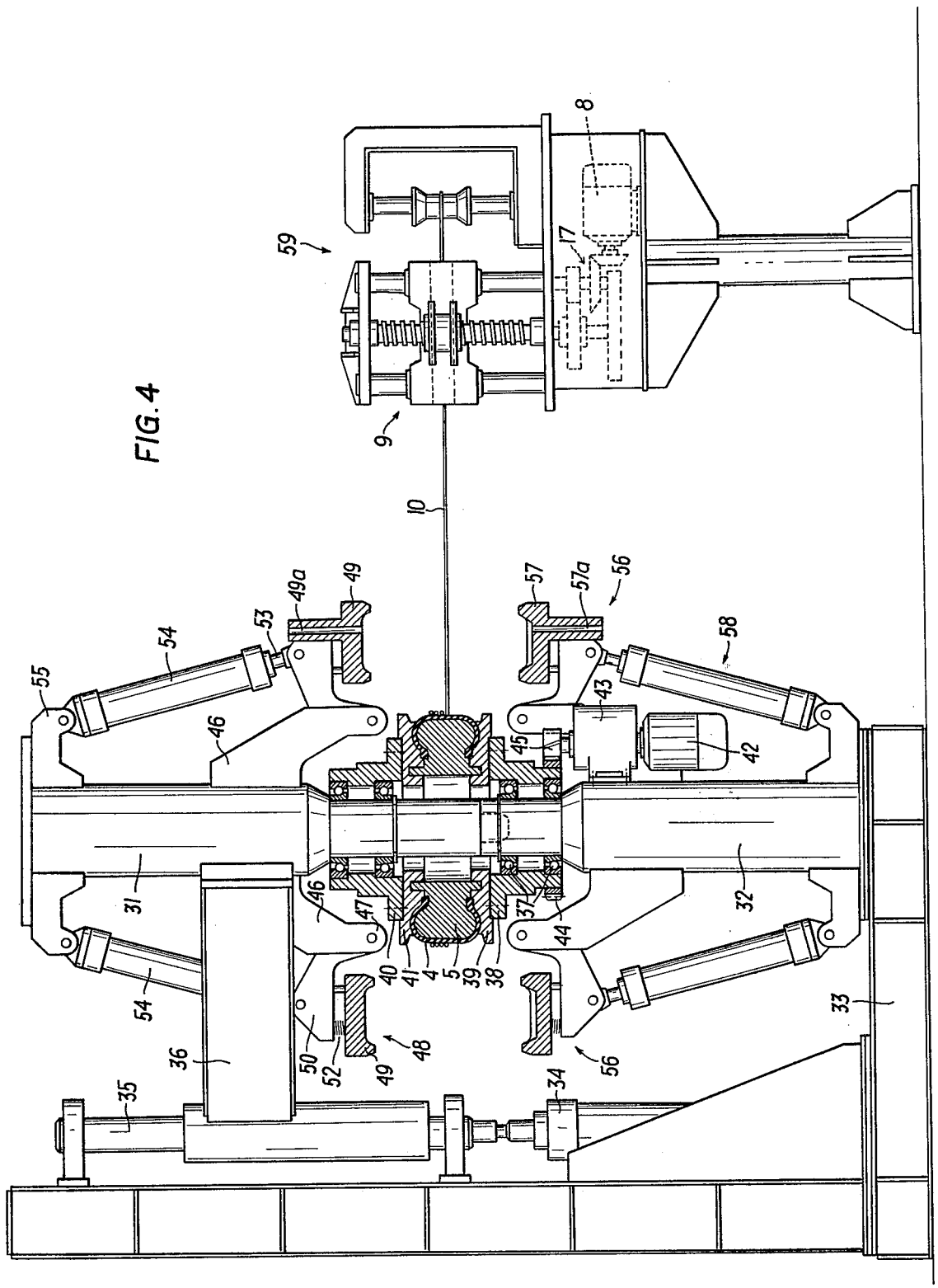
FIG. 4 is a partially sectioned side view of an apparatus for molding a tire body, winding a reinforcement about the tire body and for subsequently molding an additional outer tire portion about the tire body and the reinforcement thereon for forming the tread surface of the tire.
Figure 5:
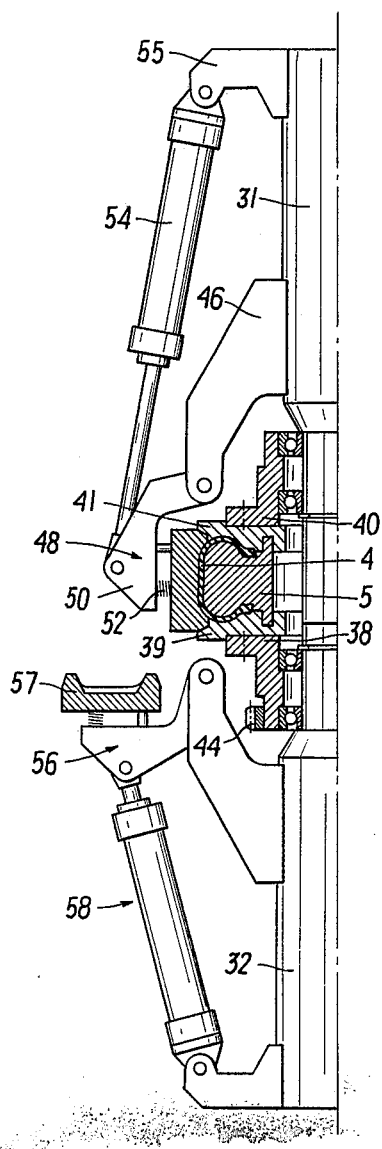
FIG. 5 is a partially sectioned side view of part of the apparatus shown in FIG. 4 and showing the same in position for molding the tire body.
Figure 6:
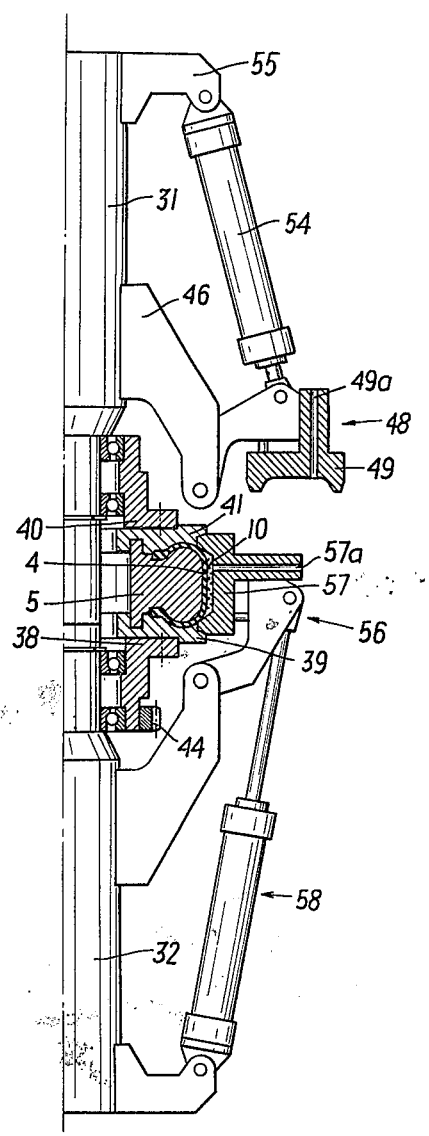
FIG. 6 is a partially sectioned side view similar to FIG. 5 and showing the apparatus during molding of the outer tread surface of the tire.

FIGS. 4–6 illustrate an apparatus for molding a tire body, for winding a reinforcement onto the peripheral surface of the tire body and for molding subsequently thereto an outer tire portion forming the tread surface of the tire about the tire body and the reinforcement thereon.

The apparatus illustrated in FIGS. 4–6 comprises support means including an upright column having two coaxial parts 31 and 32. The lower column part 32 is fixedly mounted on the base of a frame 33 and the frame includes further a vertical guide 35 on which an arm 36 is guided and movable in axial direction of the vertical guide 35 by means of a fluid-operated cylinder-and-piston unit 34. The arm 36 carries at its free end thereof the upper column part 31 for movement therewith in axial direction relative to the stationary column part 32. Ball bearings 37 on the upper end of the lower column part 32 rotationally carry a clamping flange 38, which in turn carries releasably connected thereto a lower end mold part 39 for forming a side portion of a tire. An additional clamping flange 40 is in an analogous manner turnably mounted on the upper column part 31 and an upper end mold part 41 is releasably connected for rotation with the clamping flange 40 for forming the opposite side of a tire. In the position shown in FIG. 4 the core 5 is clamped between the end mold parts 39 and 41 so that the end mold parts, the core and the clamping flanges form a unit which may be rotated by a motor 42 and gearing 43 carried by the lower column part 32. For this purpose, the lower clamping flange 38 is fixedly connected with an annular gear 44 which meshes with a pinion 45 of the gearing 43.

The upper column part 31 has a plurality of laterally and downwardly extending arms 46 on which segment means 48 are tiltably mounted by means of bearing balls 47 on the lower ends of the arms 46 and extending normal to the axis of the upper column part 31. Each of the segments means 48 comprises a mold segment 49 and a segment carrier 50, whereby the segment means 49 in the position shown in FIG. 5 form together with the two end molds 39 and 41 the outer contour of a tire body 4, whereas the inner contour is determined by the shape of the core 5.

The segments 49 are yieldably and resiliently held on the respective segment carriers 50 by the springs 52. In addition, piston rods 53 of fluid-operated cylinder-and-piston units are tiltably connected at the lower ends thereof to the segment carriers 50 whereas the cylinders 54 of these units are tiltably connected at the upper ends thereof to arms 55 projecting laterally from the upper end of the upper column part 31.

Segment means 56 are connected in the same manner to the lower column part 32 and the segment means 56 differ from the segment means 48 only in that the actually mold segments 57 have another contour. In the embodiment shown in the drawing the mold segments 57 are configurated to form the tread surface of the tire to be molded. Fluid-operated cylinder-and-piston units 58 are connected in the same manner as described above between the segment carriers 57' and arms projecting laterally from the lower end of the lower column part 32.

As shown in FIG. 4, the arrangement according to the present invention includes further a supply and guide arrangement 59 for the reinforcement 10, which differs from the guide arrangement shown in FIGS. 2 and 3 only in that it is turned about an angle of 90°.

The apparatus as illustrated in FIGS. 4–6 will be operated as follows:

In the position of the segment means 48 and 56 as shown in FIG. 4 the upper column part 31 with all of the elements connected thereto is raised by the cylinder-and-piston unit 34 and the core 35 is then placed into the apparatus. Subsequently thereto, the upper column part 31 is again lowered to the position shown in FIG. 4 so that the core 5 is clamped between the end mold parts 39 and 41. The segment means 48 will then be tilted by the cylinder-and-piston units 54 to the position as shown in FIG. 5, whereafter the material for molding the tire, preferably an elastomer is injected by standard injection means not, shown in the drawing, through a passage 49a (FIG. 6) provided in at least one of the mold segments 49 into the mold cavity formed between the core 5, the end mold parts 39 and 41 and the segments 49 in the closed position as shown in FIG. 5.

After the injected material has solidified sufficiently to retain its shape, the segment means 48 are tilted by means of the cylinder-and-piston units 54 to the position shown in FIG. 4. Subsequently thereto, one end of the reinforcement 10 is connected to the thus-formed tire body 4 and the motors 42 and 8 are started so that the core 5 and the tire body thereon are rotated and the guide 9 moved so that the reinforcement is wound about a central portion of the peripheral surface of the tire body 4 in the manner as described before in connection with FIGS. 2 and 3.

After the reinforcement 10 is wound about the peripheral surface of the tire body 4, the reinforcement is severed and its free end is connected in any known manner to the tire body. Subsequently thereto the segment means 56 are tilted to the position as shown in FIG. 6 and further material is then injected through the passage 57a to thus form the tread surface of the tire. Subsequently thereto the segment means 56 are tilted back by the cylinder-and-piston units 58 to the position shown in FIG. 4 and the upper column part 31 together with the upper mold end part 41 is lifted so that the core 5 with the finished tire thereon may be taken out from the apparatus.

In the above description of the operation of the disclosed apparatus only such steps which are essential for the invention are described and certain steps, as for instance, the cleaning or spraying with adhesive agents are not mentioned.

It will be understood that each of the elements described above, or two or more together, may also find a useful application in other types of methods and apparatus for molding a tire with an annular reinforcement below the tread surface differing from the types described above.

While the invention has been illustrated and described as embodied in a method and apparatus for molding a tire with an annular reinforcement below the tread surface in which first a tire body is molded and a reinforcement is wound about part of the outer periphery of the tire body, whereafter the tread surface portion of the tire is molded about the tire body and the reinforcement thereon, it is not intended to be limited to the details shown, since various modifications and structural changes may be made without departing in any way from the spirit of the present invention.

Thus, the reinforcement 10 may be for instance coated with adhesive agents to assure a good adhesion thereof to the tire body. The pretension at which the reinforcement 10 is wound on the tire body may also be changed by changing the tension of the springs 24 and 25 shown in FIG. 2. Furthermore, different reinforcements 10 may be used such as for instance homogeneous or heterogeneous yarns or bands may be used, and the reinforcement may be wound about the tire body in a single or a plurality of layers and in each layer in form of a helix if yarns or bands of small widths are used, or the layers may simply be superimposed upon each other without pitch if bands of large width are used.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for producing a tire with a reinforcement below the tread surface of the tire, comprising the steps of molding a tire body about a core; subsequently winding a reinforcement in circumferential direction about the circumference of the tire body; and finally molding a further portion of the tire about the reinforcement to form the tread surface of the tire.

2. A method as defined in claim 1, wherein said reinforcement comprises bands.

3. A method as defined in claim 1, wherein said reinforcement comprises threads.

4. A method as defined in claim 1, wherein said reinforcement comprises an elongated flexible member which is applied under tension to the tire body.

5. A method as defined in claim 4, wherein said member is mounted in form of a helix about the tire body.

6. A method as defined in claim 4, wherein said reinforcement is connected at one end to the tire body and the latter rotated about its axis while the reinforcement during its engagement with the tire body is shifted in axial direction of the latter.

7. A method as defined in claim 1, wherein said molding steps are injection molding steps.

* * * * *